Jan. 9, 1962
C. R. WILES
3,015,851
PROCESS FOR MAKING SHAPED CELLULAR ARTICLES
FROM FOAMABLE THERMOPLASTIC
ALKENYL AROMATIC RESINS
Filed Oct. 31, 1960
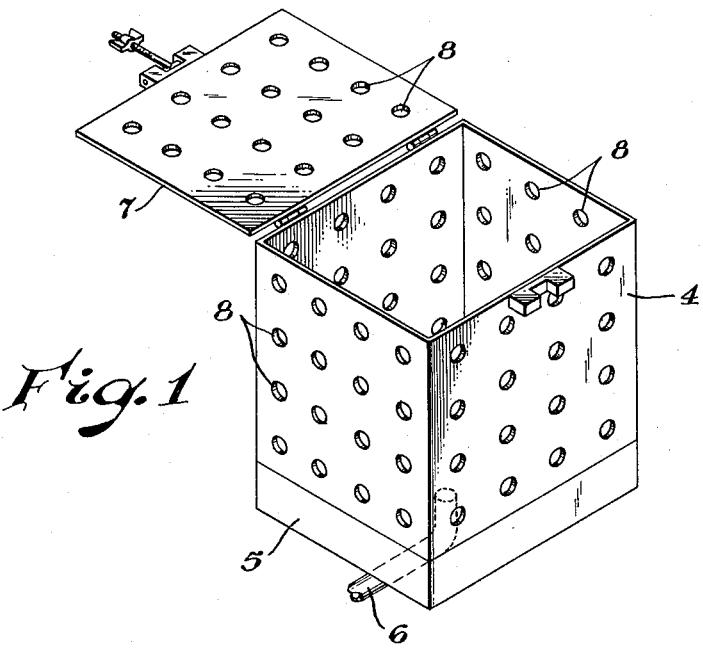
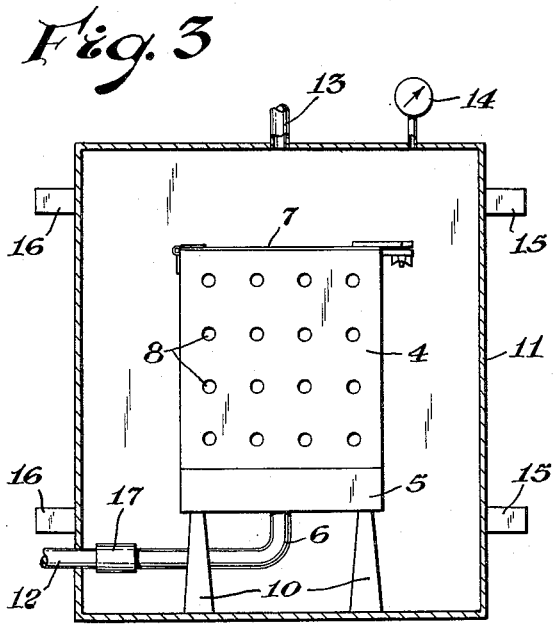
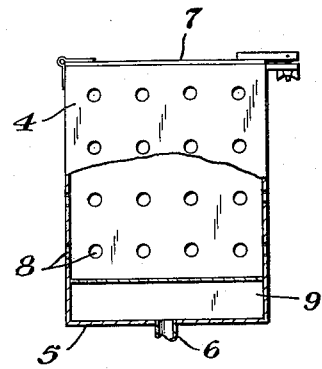
INVENTOR.
Charles R. Wiles
BY
Griswold & Burdick
ATTORNEYS

United States Patent Office 3,015,851
Patented Jan. 9, 1962

3,015,851
PROCESS FOR MAKING SHAPED CELLULAR ARTICLES FROM FOAMABLE THERMOPLASTIC ALKENYL AROMATIC RESINS
Charles R. Wiles, Midland, Mich., assignor to The Dow Chemical Company, Midland, Mich., a corporation of Delaware
Filed Oct. 31, 1960, Ser. No. 65,973
4 Claims. (Cl. 18—48)

This invention concerns a process for making shaped cellular articles of substantially uniform density from foamable thermoplastic alkenyl aromatic resins, and pertains especially to improvements in a process for expanding foamable granules of alkenyl aromatic resins in a mold to produce cellular articles having a pre-determined shape and density.

It is known that cellular shaped articles can be prepared by expanding granules of a thermoplastic alkenyl aromatic resin, e.g. polystyrene, which contains a volatile organic liquid which does not dissolve the resin such as pentane or petroleum ether (B.P. 30°–60° C.) by placing a body of the foamable resin granules in a mold, which permits the escape of gas but retains the resin material, in an amount less than is required to fill the mold, suitably from 10 to 25 percent by volume of the mold cavity, and heating the resin granules to a temperature above the boiling point of the volatile organic liquid and above the softening point of the resin. By this process the individual particles expand and are united together to form a cellular body shaped according to the mold cavity. It has also been proposed to make cellular shaped articles by a similar procedure from incompletely foamed-up granules of polystyrene which contain a volatile organic liquid, e.g. pentane, by filling a mold cavity with a body of the prefoamed granules and thereafter heating the prefoamed granules in the mold, suitably at temperatures somewhat higher than employed in the prefoaming step, to cause additional expansion and unite the individual granules into a unitary cellular article.

The methods heretofore proposed for making cellular articles from foamable granules of thermoplastic polymers have the disadvantages that the cellular articles so-produced vary widely in the density of the cellular body throughout its cross-section, particularly where the molded article is of appreciable size or thickness, and in instances, where the molded article is of intricate design, or the article consists of portions which have a relatively large cross-section joined to other portions of relatively small or thin cross-section, it is difficult to cause the granules to expand and completely fill the mold and to unite with one another to produce a uniform cellular article.

It is a primary object of the invention to provide a process for making a cellular article having a pre-determined shape and density from prefoamed granules of a thermoplastic alkenyl aromatic resin which have been incompletely foamed-up and still contain a volatile fluid foaming agent, which process avoids the difficulties of the heretofore known methods. Another object is to provide improvements in a method of causing additional expansion of incompletely foamed granules of a thermoplastic alkenyl aromatic resin containing a volatile organic fluid foaming agent which does not dissolve the resin, in a porous mold, which improvements result in additional expansion of the prefoamed resin granules to completely fill the mold cavity and cause the individual granules to form a unitary cellular article composed for the most part of individually-closed thin-walled cells and possessing a uniform density of the foam throughout its mass, together with mechanical properties commensurate with the strength of the foam. Still another object is to provide a process which includes a novel means for controlling and uniformly heating a body of the prefoamed alkenyl aromatic resin granules in a porous mold in combination with a novel means of causing additional expansion of said heated resin granules to completely fill the mold cavity and unite them into a homogeneous cellular article having a substantially uniform density of the foam throughout. Other and related objects may appear from the following description of the invention.

According to the invention cellular articles of predetermined shape having substantially uniform density throughout the cross-section of the foam can readily be prepared by filling the mold cavity of a porous mold, which permits the escape of gases, to from about 80 to 100 percent of its capacity with granules of an incompletely foamed-up, i.e. a prefoamed, foamable alkenyl aromatic resin containing a volatile organic fluid and capable of additional expansion, and thereafter heating the resin granules with steam and causing additional expansion of the prefoamed resin granules in the porous mold by a procedure as hereinafter described.

The essential features of the invention reside in the novel means of heating the prefoamed resin granules with steam and of causing additional expansion of the heated prefoamed resin granules to completely fill the cavity of the porous mold to unite the granules into a homogeneous cellular article of uniform density throughout the cross-section of the foam by a series of integrated steps which consist in: (a) passing or flowing steam through a body of the prefoamed resin granules in a porous mold at subatmospheric pressures sufficient to heat the resin particles to a temperature of about the softening point of the polymer and above the boiling point of the volatile organic fluid without appreciable expansion of the polymer granules during this initial heating up; and (b) thereafter flowing steam through the body of the resin granules at up to and including subatmospheric pressures of from 1 to 10 pounds per square inch gauge pressure and sufficient to heat the resin to temperatures between 100° and 115° C. to expand the polymer; then (c) effecting substantial drying and rapid cooling of the foamed resin in the porous mold under vacuum or subatmospheric pressure.

The invention is described more particularly with reference to the accompanying drawing wherein FIG. 1 is a schematic sketch of a porous mold suitable for making shaped cellular articles from foamable thermoplastic polymers containing a raising agent.

FIG. 2 is a sketch of the body of the porous mold, partly in section, showing an arrangement for feeding and withdrawing steam to and from the mold cavity.

FIG. 3 is a diagrammatic sketch of an arrangement of the principal major elements of apparatus suitable for practice of the invention.

In FIG. 1 of the drawing the numeral 4 indicates a cubic mold having a header 5 on the bottom with an inlet 6 therein. The mold 4 is fitted with a hinged cover 7, having suitable latching means, such as a screw and clevis as shown, for holding the cover in a closed position. Each of the sides, the cover, and the bottom of the mold contain a plurality of openings 8, suitably drill holes of a diameter of from 1/32 to 1/4 inch to permit the admission or escape of gases, but small enough to retain the resinous polymer material.

FIG. 2 of the drawing is self-explanatory and shows in cross-section a chamber 9 formed by the header 5 and the perforated bottom of the mold 4 for distribution and feed of steam into, or the withdrawal of steam from, the mold cavity via openings or drill holes 8.

In FIG. 3 of the drawing, the mold 4 is shown resting on supports 10 inside a pressure-resistant vessel 11 which vessel has inlets 12 and 13 and is fitted with a pressure gauge 14. The vessel 11 is fitted with a door (not shown)

which may be hinged to suitable lugs 15 and is provided with suitable latching means which can be by bolts (not shown) through lugs 16 and matching lugs on the door to hold the door in a closed position. The inlet 12 is fitted inside of vessel 11 with a releasable connector 17 which is joined with inlet 6 on the porous mold, in operation. Outside of vessel 11 both inlets 12 and 13 are connected through suitable pipes and valves to a vacuum pump and to a source of steam supply so that steam or vacuum can be applied to each inlet, independently, as desired.

It is important that the prefoamed polymer granules be heated in the perforated or porous mold at subatmospheric pressure, preferably at about 350 millimeters absolute pressure or below, with steam and without appreciable expansion of the resin granules during the heating up from room temperature or thereabout to the softening point of the resin or to about 70° to 80° C., until the resin is of substantially uniform temperature throughout, then raising the temperature of the resin granules to a foaming temperature, e.g. to from 100 to 115° C., by increasing the rate of flow of steam through the body of the resin granules sufficient to provide a superatmospheric pressure of said steam in the chamber surrounding the porous mold of from about 1 to 10, preferably 3 to 5, pounds per square inch gauge pressure, thereby causing the prefoamed polymer granules in the porous mold to expand and to unite with one another to form a cellular plastic block or body composed of uniform fine cells, and finally after expansion of the prefoamed resin granules by the heating with steam at superatmospheric pressures, lowering the pressure of the steam in the chamber surrounding the porous mold to subatmospheric pressure of about 350 millimeters or below, by evacuating said chamber, whereby the withdrawal of steam and/or water vapor results in a rapid cooling and drying of the foamed product to a temperature below the heat distortion temperature of the polymer throughout, with formation of a stable cellular article which has no tendency to post swell, bulge, or distort and crack.

In practice, the mold 4 is filled, suitably to from 80 to 100 percent of its capacity, with a mass of discrete incompletely foamed-up granules of a foamable alkenyl aromatic resin containing a volatile organic fluid which does not dissolve the resin and which resin granules are capable of additional expansion, preferably prefoamed resin granules having a bulk density between about 1 and about 10 pounds per cubic foot of the granules. The porous mold is closed by latching the hinged cover. The closed mold containing the resin granules is placed in vessel 11 on supports 10. The inlet 6 to header 5 is connected by releasable connector 17 to inlet 12 leading outside of vessel 11. The door to vessel 11 is closed and secured in place to make a gas tight seal. Thereafter, vessel 11 is evacuated through inlet 13 to a subatmospheric pressure of from 50 to 350, preferably to from 50 to 100, millimeters of Hg absolute pressure or below, as can readily be determined by gauge 14. Steam, suitably steam from a source of supply of from 5 to 150 pounds per square inch gauge pressure, is fed via inlet 13 into vessel 11, thence through the drill holes 8 in the sides and top of the mold 4 and into contact with and through the body of the resin granules in the mold cavity and is discharged from the mold through the drill holes 8 in the bottom of said mold and withdrawn via conduit 6 connected to inlet 12 leading outside of vessel 11. The rate of feed of steam to the vessel 11 via inlet 13 and the rate of withdrawal of steam from the vessel 11 via mold 4 and outlet or inlets 6 and 12 is regulated so as to maintain the pressure in the vessel 11 at from about 50 to 350 millimeters of Hg absolute pressure, or below. The time for which steam is fed into the mold will vary, depending for the most part upon the size of the mold, but is usually of the order of from about 0.1 minute up to about 5 minutes, to heat the resin granules in the porous mold up to about its softening point, e.g. to about 70–80° C. Alternatively, after flow of the steam into the vessel 11 and through the mold cavity via the drill holes 8 into contact with and through the body of the resin granules therein, and while the mold is maintained at a subatmospheric pressure in vessel 11 for a time of from about 0.1 minute to 5 minutes, the flow of steam to vessel 11 is reversed by connecting inlet 13 to a vacuum pump and feeding steam via inlets 12 and 6, and mold 4 into vessel 11. The steam is steam withdrawn from a source of supply at from 5 to 150 pounds per square inch gauge pressure and is fed via inlets 12 and 6 and mold 4 into vessel 11 at a rate such that the pressure within vessel 11 is maintained at a value not substantially greater than 350 millimeters of Hg absolute pressure and in a period of from 0.25 minute to 5 minutes while continuously withdrawing steam from said vessel via conduit 13 so as to produce a flow of steam through the porous mold 4 via header 5 and the resin granules therein, to heat the entire body of the resin granules to a temperature of about 80° C. The alternate flow of steam at subatmospheric pressure through the body of the resin granules in the mold during the heating up to the softening point of the resin results in advantageous heating of the resin granules to a substantially uniform temperature throughout the mass of the material and control of the temperature to avoid appreciable expansion of the resin granules during such heating up by regulating the absolute pressure within the vessel 11. The alternate flow of steam to and fro through the body of the resin granules can be carried out for one or a plurality of cycles.

After the flowing of steam through the body of the resin granules in the porous mold for a period of from about 1 to 5 minutes, such that the resin granules are heated to from 70° to 80° C. throughout, the flow of steam to the mold, preferably via inlet 13, is increased in rate sufficient to provide a superatmospheric pressure of from 1 to 10, preferably from 3 to 5, pounds per square inch gauge pressure within vessel 11 while at the same time withdrawing steam from the chamber and mold via conduits 6 and 12 to raise the temperature of the resin granules to from 100° to 115° C. and expand the heated granules and unit them into a cellular body completely filling the mold. Thereafter, the feed of steam to the chamber 11 is discontinued and said chamber is evacuated to an absolute pressure of 350 millimeters of Hg or below, e.g. to a subatmospheric pressure of from 50 to 350 millimeters of Hg absolute pressure, whereby the expanded resin body in the porous mold is substantially dried and rapidly cooled throughout to a temperature below the softening point of the polymer as a homogeneous cellular article conforming to the shape of the mold and having a uniform density throughout the cross-section of the foam.

The process can be employed for making cellular articles from polystyrene, polyvinyl chloride, copolymers of vinyl and vinylidene chloride, polyacrylic esters, polymethacrylic esters, copolymers of styrene and methyl methacrylate, copolymers of styrene and acrylonitrile or copolymers of styrene and natural or a synthetic rubber. The method is advantageously employed for making cellular articles from alkenyl aromatic resins such as the thermoplastic resinous polymers and copolymers of one or more monovinyl aromatic compounds of the benzene series wherein the polymeric resin comprises in chemically combined form at least 70 percent by weight of at least one monovinyl aromatic compound having the general formula:

$$Ar\text{—}CH\text{=}CH_2$$

wherein Ar represents an aromatic hydrocarbon radical or an aromatic halohydrocarbon radical of the benzene series. Examples of such alkenyl aromatic resins are the solid homopolymers of styrene, vinyltoluene, vinylxylene, ar-ethylvinylbenzene, isopropylstyrene, tert.-butylstyrene, ar-chlorostyrene, ar-dichlorostyrene, ar-fluorostyrene, ar-bromostyrene; the solid copolymers of two or more of such monovinyl aromatic compounds and solid copolymers of one or more of such monovinyl aromatic compounds and minor amounts, e.g. from 1 to 30 percent by weight, of other readily copolymerizable olefinic compounds such as acrylonitrile, methyl methacrylate or ethyl acrylate.

The alkenyl aromatic resins containing a volatile organic fluid as raising agent can be prepared in usual ways, e.g. by polymerizing the monomers in admixture with the volatile organic fluid or by soaking or impregnating the solid polymer with the foaming agent under pressure. Suitable volatile organic fluid are saturated aliphatic hydrocarbons containing from 4 to 7 carbon atoms in the molecule such as butane, pentane, hexane, heptane, cyclohexane and perchlorofluorocarbons such as dichlorodifluoromethane, trichlorofluoromethane, monochlorotrifluoromethane, tetrachlorodifluoroethane, dichlorotetrafluoroethane or monochloropentafluoroethane, which fluid agent has a molecular weight of at least 58 and a boiling point below 95° C. or lower at atmospheric pressure. The fluid foaming agent is usually employed in amount corresponding to from about 3 to about 25 percent by weight of the total mixture.

In order to prepare incompletely foamed-up granules of the thermoplastic substances from polymers containing the raising agents, the granules of the alkenyl aromatic resin containing the volatile organic fluid are heated above the softening point of the substance and above the boiling point of the volatile organic fluid raising agent for a time such that only part of the foaming agent is used up in incompletely foaming the resin granules. This first heating can be carried out with hot water, steam, di-electric heating, or infra-red radiation or with hot air. The alkenyl aromatic resin granules, which normally are solid particles having a bulk density of 30 pounds or more per cubic foot of the resin beads, e.g. polystyrene beads prepared by polymerizing monomeric styrene with 6 percent by weight of n-pentane in aqueous suspension, are preferably prefoamed to obtain incompletely foamed-up resin granules having a bulk density between 1 and 10 pounds per cubic foot of the prefoamed granules for use in the invention.

In practice, a porous mold is filled to at least 80 percent of its capacity, and preferably filled completely, with a body of the prefoamed resin granules capable of additional expansion, and the mold is closed. The mold is placed in a zone of subatmospheric pressure, e.g. a chamber within a pressure-resistant vessel, maintained at from 50 to 350 millimeters of Hg absolute pressure and is heated by flowing steam through a section of the surface area of the porous mold into contact with and through the body of the resin granules therein to heat the resin granules, to or near their softening point while withdrawing steam from another section of the surface area of the mold, and from the chamber containing the mold so as to maintain the total pressure on the resin granules at below atmospheric pressure during the heating up of the resin granules to about the softening point of the resin. When the resin granules have been heated to their softening point or thereabout with steam at subatmospheric pressure, the rate of flow of steam to the chamber containing the mold is increased sufficient to build up a superatmospheric pressure of from 1 to 10, preferably from 3 to 5, pounds per square inch gauge pressure while at the same time continuing to pass the steam through the porous mold and into contact with and through the resin granules therein whereby the resin granules are heated to a temperature of from 100 to 115° C. and are caused to undergo expansion to unite wtih one another and fill the mold with a unitary cellular mass of the resin. Thereafter, the flow of steam is discontinued and the chamber containing the porous mold is evacuated to a subatmospheric pressure of 350 millimeters of Hg or below, whereby the cellular body in the mold is substantially dried and is rapidly cooled throughout to a tempearture below the softening point of the resin.

After effecting the drying and cooling of the foamed alkenyl resin shaped cellular article under vacuum, the pressure is allowed to return to atmospheric pressure. The mold containing the shaped article is removed from the vacuum chamber. The mold can be opened immediately, or advantageously is allowed to cool in air at room temperature for a period of from 15 to 30 minutes, prior to opening the mold and removing the cellular article. The time of cooling by exposure to air at ordinary conditions will vary depending upon the size of the mold, but in general a short cooling time of from 15 to 30 minutes standing in air results in cellular articles having a smooth surface.

Saturated steam or superheated steam can be used in the process, or steam in admixture with inert gases such as air, carbon dioxide, nitrogen, methane, ethane, propane, butane, helium and the like. Superheated steam is advantageously employed in the process since this results in less condensation during the heating-up and expanding of the resin granules. Upon lowering of the pressure on the porous mold to subatmospheric pressure, in the final step in the process, not only is the small amount of condensed water evaporated and removed from the cellular article, but such evaporation results in rapid cooling of the interior portions of the cellular article and prevents post swelling, shrinking, cracking or collapse of the cells, and permits removal of the foamed article from the mold without prolonged waiting for interior portions of the cellular article to cool.

The following examples illustrate ways in which the principle of the invention has been applied, but are not to be construed as limiting its scope.

*Example 1*

A perforated cubic mold having interior dimensions of 25 x 25 x 25 inches was filled with 11.2 pounds of free-flowing beads of partially foamed polystyrene having a bulk density of 1.5 pounds per cubic foot and containing normal pentane as the blowing agent. Prior to partially foaming, the polystyrene was in the form of solid beads having a bulk density of about 35 pounds per cubic foot and contained 6 percent by weight of n-pentane. The perforated mold employed in the experiment had in each of its sides a plurality of $\frac{1}{16}$ inch drill holes on $\frac{7}{8}$ inch centers. One side of the outer surface of the 25 x 25 x 25 inch cubic mold was connected to a header having an inlet thereto for feed of steam into the mold cavity or the withdrawal of steam from said cavity through the $\frac{1}{16}$ inch drill holes in the wall of the mold. After filling the mold cavity with the prefoamed polystyrene beads, the mold was closed and was placed in a pressure-resistant vessel having suitable inlets and outlets for feeding steam into the chamber surrounding the mold, or evacuating the chamber surrounding the perforated mold, and a closure, e.g. a door, for inserting the mold into, and removing the mold from, the pressure-resistant vessel, together with means for feeding steam into the header on the bottom of the perforated mold within the partly evacuated pressure-resistant vessel and was passed via the $\frac{1}{16}$ inch drill holes in the mold wall into the mold cavity and into contact with and through the body of the prefoamed beads in the mold cavity at a rate of 50 pounds of the steam per hour over a period of 0.5 minute while continuing to evacuate the chamber surrounding the mold so as to maintain the pressure in the chamber surrounding the mold at 150 millimeters absolute pressure during this treatment. Thereafter the direction of the flow of steam was reversed by withdrawing steam from the header on the mold while feeding steam into the chamber surrounding the mold and passing the steam into the porous mold and through the body of the polystyrene beads therein for a period of 2.5 minutes while maintaining the pressure in said chamber at below atmospheric pressure to heat the resin granules to a temperature of 75° C. Then, the steam, which was withdrawn from a 150 pounds per square inch gauge pressure source of supply, was fed into the chamber in the pressure-resistant vessel surrounding the mold at a faster rate sufficient to provide a pressure in said vessel of 3 pounds per square inch gauge pressure, in a period of 2 minutes. The polystyrene beads in the mold were heated by this treatment to a substantially uniform temperature of 105° C. and were expanded to form a cellular mass completely filling the mold. After this treatment, the feed of steam was discontinued. The conduit leading to the header on the mold was closed, and the chamber surrounding the mold in the pressure-resistant vessel was evacuated to an absolute pressure of 250 millimeters, thereby causing the cellular polystyrene body in the mold cavity to be substantially dried by vaporization and removal of the water and rapidly cooled to a temperature of 75° C. throughout, to produce a cellular article conforming to the shape of the mold and having a uniform density. After cooling the cellular body by evacuating the pressure-resistant vessel to an absolute pressure of 250 millimeters, the pressure was allowed to return to atmospheric pressure. The vessel was opened and the mold was removed. The cellular article was allowed to stand for 20 minutes in the mold, then was removed. The cube was cut into square bars of 5 x 5 inches cross section. A portion of a bar, reading from top to bottom of the cube as it was prepared in the mold, was tested to determine its density. The foamed product had densities throughout its mass as follows:

| Test bar No.: | Density, lbs./cu. ft. |
| --- | --- |
| 1 | 1.47 |
| 2 | 1.40 |
| 3 | 1.43 |
| 4 | 1.42 |
| 5 | 1.42 |

*Example 2*

The porous mold of 25 x 25 x 25 inches described in Example 1 was filled with prefoamed polystyrene granules having a bulk density of 1.5 pounds per cubic foot of the prefoamed granules of sizes between 6 and 10 mesh per inch as determined by U.S. Standard screens. The mold was closed and was placed in a pressure-resistant vessel equipped with suitable inlets and outlets for feeding steam into the chamber within the pressure-resistant vessel surrounding the porous mold or evacuating the chamber and withdrawing steam from said chamber, and a closure, e.g., a door, for inserting the mold into, and withdrawing the mold from, the pressure-resistant vessel, together with means for feeding steam into the header on the porous mold and withdrawing steam from the header on the mold. The inlet to the header on the mold was connected to a conduit leading outside of the pressure-resistant vessel through a suitable stuffing box. The door to the pressure-resistant vessel was closed and sealed. Thereafter, the chamber in the pressure-resistant vessel surrounding the porous mold was evacuated to an absolute pressure of 50 millimeters of mercury. Steam was withdrawn from a pressure supply at 150 pounds per square inch gauge pressure and was fed into the evacuated chamber within the pressure-resistant vessel, thence through walls of the porous mold and into contact with and through the body of the polystyrene granules in the mold cavity and was withdrawn via the header on the mold and the conduit thereto leading outside of the pressure-resistant vessel at a rate of about 50 pounds of the steam per hour over a period of three minutes while maintaining an absolute pressure of from 50 to 350 millimeters of Hg in the chamber surrounding the porous mold. By this procedure the temperature of the polystyrene granules in the mold cavity was raised from room temperature to about 75° C. Thereafter, the rate of feed of the steam to the chamber surrounding the mold was increased sufficient to provide a pressure in said chamber of 3 pounds per square inch gauge pressure for a period of three minutes while at the same time continuing to withdraw steam from said chamber via the porous mold, its header and conduit connected thereto at a rate of about 50 pounds per hour. By this step in the procedure the polystyrene granules in the porous mold were heated from a temperature of about 75° C. to a temperature of 105°–110° C. and were caused to undergo expansion with resultant pressing together of the individual granules and their uniting with one another to form a cellular mass or body, free from voids and composed for the most part of uniformly fine, thin-walled, individually-closed cells. Immediately following expansion of the polystyrene granules to fill the porous mold, the steam pressure was released and was reduced to subatmospheric pressure by withdrawing vapors from the chamber surrounding the porous mold at a rate corresponding to about 50 pounds per hour of steam until the absolute pressure in said chamber was about 250 millimeters of Hg. This required a period of 12 minutes, during which the temperature of the foamed product in the porous mold was lowered from about 110° C. to a temperature of 75° C. throughout. Thereafter, the pressure in the chamber was allowed to return to atmospheric pressure. The vessel was opened, and the mold was removed. The mold was opened and the cellular block of polymer was removed. The product was of uniform cell size and density throughout. No post swelling or bulging or cracking of the foamed polystyrene occurred.

In contrast, when the foamed product is removed from the porous mold before the temperature of the foam or cellular body is at about 80° C. or below, throughout, the foam block will swell, bulge or otherwise deform and will, upon slicing to observe the interior portions, be found to contain cracks and be of undesirable uniformity throughout.

Also, for purpose of observing whether appreciable expansion of the prefoamed polystyrene granules occurs during the heating up of the granules in the mold by passing steam therethrough at subatmospheric pressures of about 350 millimeters absolute pressure and below, the porous mold was filled with another charge of the batch of the prefoamed polystyrene granules and was placed in the pressure-resistant vessel and was heated by flowing steam therethrough at subatmospheric pressure in the manner described above for a period of 3 minutes whereby the temperature of the polymer granules was raised from room temperature up to 80° C. Thereafter, the heating was discontinued, and the porous mold was removed from the pressure-resistant vessel and was opened. The heated prefoamed polystyrene granules were found to be free-flowing and could readily be dipped or poured from the mold.

*Example 3*

The porous mold described in Example 1 was filled with a charge of prefoamed granules of a copolymer of 70 percent by weight of styrene and 30 percent by weight of acrylonitrile which prefoamed granules were of sizes between 0.25 and 0.5 inch in diameter, were capable of further expansion and contained a low boiling petroleum ether fraction (B.P. 30–46° C.) as blowing agent. The prefoamed copolymer beads had a bulk density of one pound per cubic foot of the beads. Prior to prefoaming, the copolymer was in the form of solid granules of about 0.125 inch diameter having a bulk density of 35 pounds per cubic foot and contained 5.5 percent by weight of peroleum ether, B.P. 30–46° C. The mold containing the prefoamed copolymer granules was placed in a pressure resistant vessel wherein the copolymer granules were heated and foamed to a cellular article employing procedure similar to that employed in Example 2. There was obtained a cellular block of the copolymer foam having a uniform density of one pound per cubic foot and composed of uniform fine cells throughout.

Example 4

The porous mold described in Example 1 was filled with a charge of foamable styrene-acrylonitrile copolymer granules similar to that employed in Example 2, prefoamed to a bulk density of 6 pounds per cubic foot of the granules. The mold was closed and placed in a pressure-resistant vessel wherein the copolymer granules were heated and foamed to form a cellular block employing procedure similar to that employed in Example 3. There was obtained a cellular product having a density of 6 pounds per cubic foot of the foam and composed of fine closed thin-walled cells of about 0.1 millimeter diameter.

I claim:

1. A process for making a cellular plastic article having a predetermined density and shape, which process comprises filling the cavity of a porous mold to at least 80 percent by volume of its capacity with discrete granules of an incompletely foamed-up thermoplastic alkenyl aromatic polymer containing a volatile non-solvent organic fluid raising agent and which is capable of further expansion and closing the mold, maintaining the closed porous mold in a zone of subatmospheric pressure and passing steam into contact with and through the mass of polymer granules therein at subatmospheric pressures not exceeding 350 millimeters of Hg absolute pressure, to heat the granules to about the softening point of the polymer, then passing steam into contact with the porous mold and into contact with and through the polymer granules in the mold at up to and including superatmospheric pressures of not greater than 10 pounds per square inch gauge pressure sufficient to heat the polymer to a temperature between 100° and 115° C., thereby expanding the polymer granules within said porous mold to completely fill the mold cavity with a cellular body of the foamed polymer, and thereafter withdrawing steam from contact with said porous mold and the cellular body sufficient to subject the mold and the cellular body therein to an absolute subatmospheric pressure of not more than 350 millimeters of Hg.

2. A process according to claim 1, wherein the incompletely foamed-up alkenyl aromatic polymer is polystyrene.

3. A process according to claim 1, wherein the incompletely foamed-up alkenyl aromatic polymer is a copolymer of approximately 70 percent by weight of styrene and approximately 30 percent by weight of acrylonitrile.

4. A process according to claim 1, wherein the incompletely foamed-up alkenyl aromatic polymer granules have a bulk density of from 1 to 10 pounds per cubic foot of the resin granules.

References Cited in the file of this patent

UNITED STATES PATENTS

| | | |
|---|---|---|
| 2,907,072 | Jodell | Oct. 6, 1959 |
| 2,948,926 | Kuhn | Aug. 16, 1960 |